United States Patent
Goddard

[11] Patent Number: 6,126,209
[45] Date of Patent: Oct. 3, 2000

[54] PIPE HAVING AN IN-LINE BELL

[75] Inventor: James B. Goddard, Powell, Ohio

[73] Assignee: Advanced Drainage Systems, Inc, Columbus, Ohio

[21] Appl. No.: 09/228,023

[22] Filed: Jan. 8, 1999

[51] Int. Cl.[7] .................................................. F16L 17/02
[52] U.S. Cl. ............................ 285/347; 285/3; 285/423; 285/903
[58] Field of Search .................................. 285/903, 347, 285/231, 226, 227, 228, 423, 3, 4; 138/109

[56] References Cited

U.S. PATENT DOCUMENTS

| | | |
|---|---|---|
| 3,239,254 | 3/1966 | Campbell . |
| 3,794,364 | 2/1974 | Williams ................................ 298/903 |
| 3,926,222 | 12/1975 | Shroy et al. . |
| 4,141,576 | 2/1979 | Lupke et al. . |
| 4,149,740 | 4/1979 | Hall . |
| 4,443,031 | 4/1984 | Borsh et al. . |
| 4,647,074 | 3/1987 | Pate et al. . |
| 4,795,197 | 1/1989 | Kaminski et al. . |
| 4,969,670 | 11/1990 | Bonnema et al. ....................... 285/903 |
| 5,071,173 | 12/1991 | Hegler et al. . |
| 5,080,405 | 1/1992 | Sasa ......................................... 285/903 |
| 5,348,051 | 9/1994 | Kallenbach ............................ 138/109 |
| 5,765,880 | 6/1998 | Goddard ................................. 285/903 |
| 5,992,469 | 11/1999 | Hegler ................................... 138/109 |
| 5,996,635 | 12/1999 | Hegler ................................... 138/109 |

*Primary Examiner*—Dave W. Arola
*Attorney, Agent, or Firm*—Kremblas, Foster, Millard & Pollick

[57] ABSTRACT

An in-line bell pipe is provided, formed by joining at least two corrugated sections of pipe having a male portion and a female portion to connect the corrugated sections. Each corrugated section has a plurality of first corrugations having a crest and a valley, with the distance between the crest and valley of the first corrugations being a first distance. The male portion of each corrugated section has at least one second corrugation and one third corrugation, with each second corrugation and each third corrugation having a respective crest and valley and with the distance between the respective crests and valleys being a second distance and a third distance respectively. The second distance and the third distance each are less than the first distance. The crest of the third corrugation also has a recessed area that accommodates a sealing element, with the sealing element being retained the recessed area and the female portion.

17 Claims, 2 Drawing Sheets

PIPE HAVING AN IN-LINE BELL

FIELD OF THE INVENTION

The present invention relates generally to pipe, and more particularly, to a pipe which is formed having an in-line bell so as to obviate the need for a separate coupler, or for one which does not, when assembled, have its coupler of a significantly greater dimension than the rest of the pipe.

BACKGROUND OF THE INVENTION

This invention is directed to the providing of corrugated pipe, and more particularly to the providing of corrugated pipe of the type used in the drainage of soil for agricultural, residential, or recreational purposes, including but not limited to storm sewer uses. In this particular market, clay or concrete tile, tube, or pipe was traditionally utilized. In practice, the drainage pipe was installed through the placing together of relatively short sections of the pipe to construct the desired drainage system. Such sections or pieces could range from a few feet to more than a couple of dozen feet. Consequently, construction was extremely time consuming and relatively expensive because of the number of pieces and total weight associated with the components of the drainage system. Additionally, the relatively large number of pipes which were required to be installed for such systems necessitated proper positioning of an large numbers of pipe in order to insure minimal leakage.

More recently, plastic began to be used as a construction material for drainage pipe. Originally, sections of the plastic pipe or tubing were provided in predetermined lengths or sections which then were interconnected by using separate couplers or coupling units. Sometimes pipe or tubing of a relatively small diameter rolls of more than 200 feet can be used, which can impact on cost savings and ease of assembly. For pipe with greater diameters, ease of assembly and cost savings often focused on the manufacture of the coupler and the ease of installation.

This focusing on coupler structure resulted in numerous couplers for use with corrugated pipe, all of which had an exterior diameter greater than the exterior diameter of the sections of installed pipe. Consequently, it became necessary either to dig a trench wide enough to accommodate the diameter of the installed coupler or provide a trench closer to the diameter of the corrugated pipe itself. In the former case, additional ground needed to be disturbed and additional fill needed to be replaced, both of which factors would drive up the cost of installation. In the latter case, the trench would have to be widened at the location of the installed coupler. would require additional digging, which of course would be time consuming.

As mentioned briefly above, couplers are well known in the prior art. A typical type of coupler could involve a polyethylene wrap secured about the adjacent ends of pipe by a fastener. These split-couplers normally require an overlap, such that the gap between the interior surface of the coupler and the exterior surface of the pipe is invariably present. Even if a gasket is placed between the adjacent pieces of pipe, installation in conjunction with the wrapped coupler may still result in a leak. A coupler similar to this is disclosed in U.S. Pat. No. 3,239,254 to Campbell.

Another type of coupler involves a heat shrink wrap as is disclosed in Lupke, et al, U.S. Pat. No. 4,141,576. Obviously, this type of coupler has disadvantages and applications with large diameter corrugated pipe where there is a need for the pipe to remain water-tight over an extended period of time.

A number of couplers are known which comprise two arcuate sections, hinged or independent of one another, with these two sections being secured together. Examples of such couplers include Borsch, et al, U.S. Pat. No. 4,443,031, and Pate, U.S. Pat. No. 4,647,074. However, both of these couplers are specifically designed to work annular conduit systems, as opposed to helical. This distinction is important, because it is far easier to effect a water-tight seal on an annular system than it is with helical due to the configuration of the respective conduit structures. Meanwhile, many types of larger diameter extruded pipe are formed using the helical technique.

Several patents disclose couplers for use with helical pipe. Examples of such patents include Hall, U.S. Pat. No. 4,149,740 and Kaminski, U.S. Pat. No. 4,795,197. Hall discloses a pipe coupler for use with pipe which appears substantially helical. However, interestingly enough the ends of each pipe section with which the coupler of Hall can be used either must be flat and level as shown in FIG. 3 of Hall, or fabricated with the outwardly extending flanges as shown in its FIG. 2. Consequently, Hall recognized the problem associated with trying to obtain a water tight seal in true helical pipe.

The Kaminski patent discloses a coupling for seed and fertilizer hoses, and as such is not concerned with whether the coupling is effectively water-tight. Its concern is providing a relatively air-tight seal. Although the coupling of Kaminski could be used with true helical pipe, it would not be expected to perform in drainage applications so as to guarantee the integrity of the drainage system.

Ideally it would be desirable to lay corrugated drainage pipe that would incorporate an in-line bell. A plastic pipe having an in-line bell is shown in Hegler, U.S. Pat. No. 5,071,173, however, this pipe is specifically designed for sewer pipe reconstruction, a practice known in the trade as relining. The pipe of Hegler was not designed to serve as the initial drainage pipe laid at a particular location.

Shroy, et al, U.S. Pat. No. 3,926,222, discloses a corrugated tubing with integral coupling means thereon. However, this particular invention relates only to single wall pipe, as opposed to dual wall. Additionally, no provision is made for attempting to obtain a tight seal, such as through the use of a sealing element.

It is thus apparent that the need exists for an improved pipe which provides for an in-line bell, and especially one which is a dual-wall pipe.

SUMMARY OF THE INVENTION

In accordance with this invention an indeterminate length of pipe comprised of at least two corrugated sections of pipe joined by a coupler component is provided. The coupler component has a male portion and a female portion to connect at least two corrugated sections. Each corrugated section has a plurality of first corrugations, with each of these first corrugations having a crest and a valley, with the distance between the crest and valley of the first corrugations being a first distance.

The male portion of each corrugated section has at least one second corrugation. Each second corrugation has a crest and valley with the distance between the crest and valley of each second corrugation being a second distance. The male portion of each corrugated section has at least one third corrugation. Each third corrugation has a crest and valley with the distance between the crest and valley of each third corrugation being a third distance. The second distance and third distance each are less than the first distance. The crest of each third corrugation has a recessed area, with the recessed area accommodating a sealing element, for example, a gasket. The sealing element is retained between the recessed area and the female portion.

The pipe preferably is dual-wall. Further, in the preferred embodiment of the invention there is only a single second corrugation and a single third corrugation. The female portion has a wall member having a crest and valley, with the distance between the crest and valley of the female portion being a fourth distance. The fourth distance is greater than each of the second distance and the third distance, although the fourth distance is less than the first distance. The female portion wall member telescopically receives the second corrugation and the third corrugation.

There is also disclosed a connection between two sections of corrugated pipe, which pipe has a plurality of first corrugations, with each of the first corrugations having a crest and a valley, and with the distance between the crest and valley of the first corrugations being a first distance. The connection has a male portion integrally molded to one of the sections and a female portion integrally molded to the other of the sections.

The male portion has at least one second corrugation, with each second corrugation having a crest and valley with the distance between the crest and valley of each second corrugation being a second distance. The male portion also has at least one third corrugation, with each third corrugation having a crest and valley with the distance between the crest and valley of each third corrugation being a third distance. The crest of each third corrugation has a recessed area.

The female portion has a plurality of corrugations thereon, with each of the female portion corrugations having a crest and a valley with the distance between the crest and valley of the female portion corrugations being less than the second distance and less than the third distance.

In the preferred embodiment of the invention there is only a single second corrugation, and a single third corrugation. Also, the female portion has a wall member having a crest and valley, with the distance between the crest and valley of the female portion being a fourth distance, with the fourth distance being greater than the second distance and greater than the third distance.

There is also disclosed an indeterminate length of dual-wall plastic pipe having of at least two corrugated sections of pipe joined by a coupler component. The coupler component has a male portion and a female portion to connect at least two corrugated sections. Each corrugated section has a plurality of first corrugations, with each of the first corrugations having a crest and a valley and with the distance between the crest and valley of the first corrugations being a first distance.

The male portion of each corrugated section has a single second corrugation. The second corrugation has a crest and valley with the distance between the crest and valley of each second corrugation being a second distance. The male portion of each corrugated section has a single third corrugation. The third corrugation has a crest and valley with the distance between the crest and valley of each third corrugation being a third distance. The crest of the third corrugation has a recessed area, with the recessed area accommodating a sealing element. The sealing element is retained between the recessed area and the female portion.

The female portion has a wall member having a crest and valley, with the distance between the crest and valley of the female portion being a fourth distance. The fourth distance is greater than each of the second distance and the third distance, but less than the first distance. The second distance and the third distance each are less than the first distance. The female portion wall member telescopically receives the second corrugation and is the third corrugation.

The primary objective of this invention is to provide a dual-wall plastic pipe with an in-line bell which is of relatively economical construction and is particularly easy to utilize in the laying of pipe.

Other objects and advantages of the invention will be apparent from the following description, the accompanying drawings, and the appended claims.

DETAILED DESCRIPTION OF THE DRAWINGS

Figure 1:
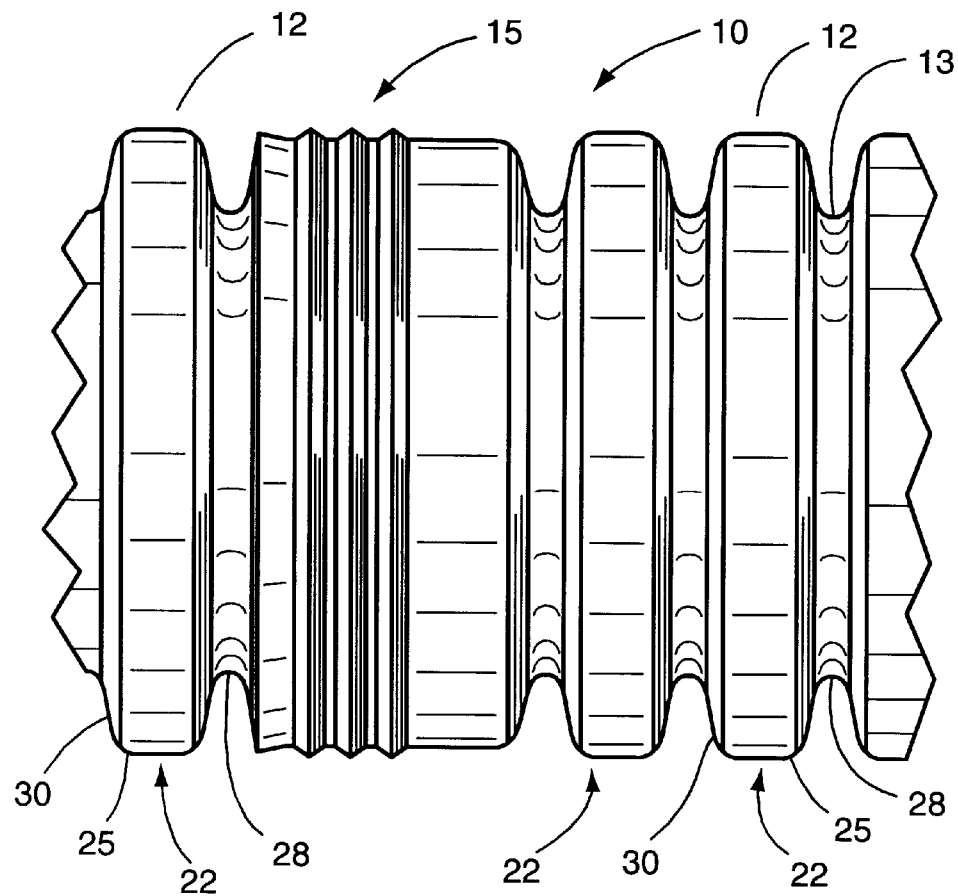
FIG. 1 is a side elevational view of a portion of a pipe of indeterminate length made in accordance with the present invention
Figure 2:
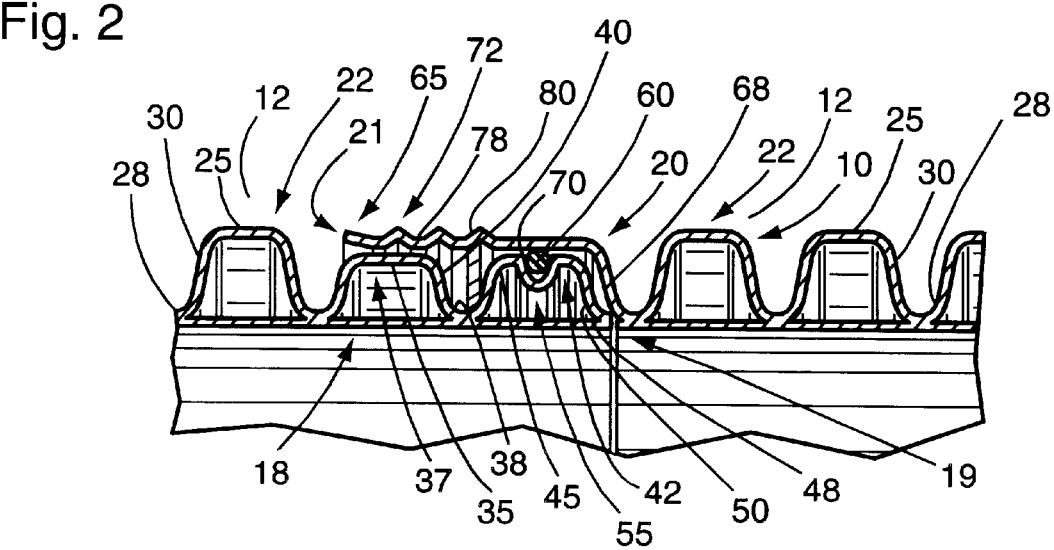
FIG. 2 is a vertical sectional view on an enlarged scale of the portion of the pipe shown in FIG. 1.
Figure 3:
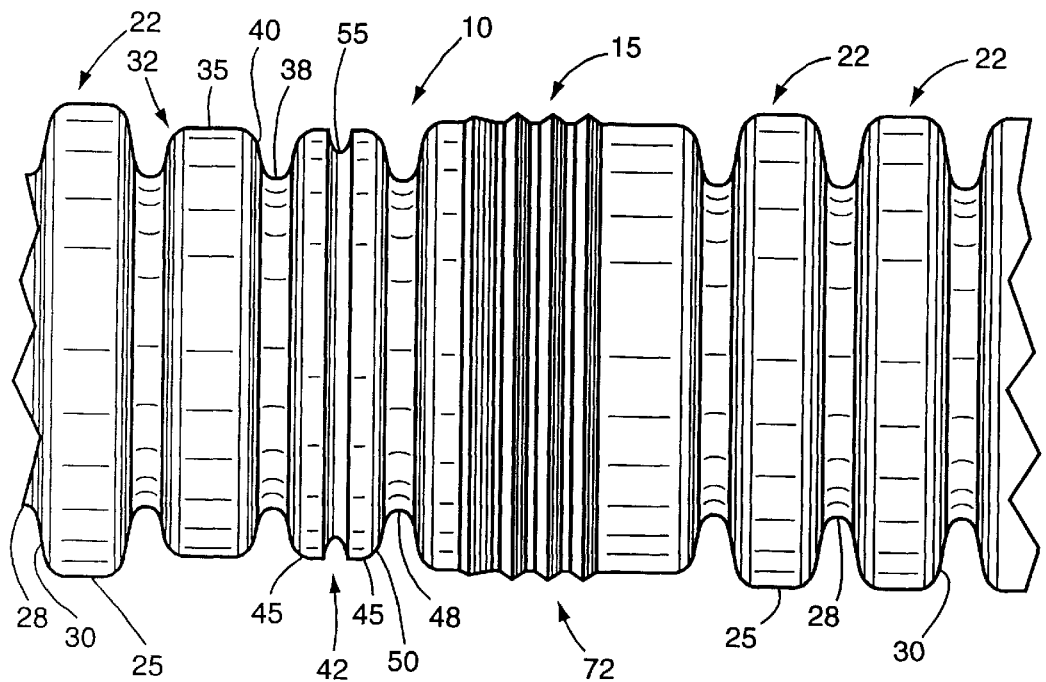
FIG. 3 is an side elevational view of a portion of the invention prior to severing the male portion and female portion of the coupler component of the invention.

Having reference to the drawings, attention is directed first to FIGS. 1 and 2 which disclose a corrugated dual wall pipe of indeterminate length designated generally by the numeral 10. This pipe is shown in FIGS. 1 and 2 as it appears when it is installed in the ground as the initial drainage pipe at a location. As such, it can be appreciated that the pipe of this invention is not intended for use for re-lining of earlier laid pipe, but as the original drainage pipe at a location. It can also be appreciated that the pipe 10 is formed from a plurality of individual pipe sections 12. The pipe has a number of coupler components 15 with each coupler component having a male portion 18 with a male portion engagement edge 19, and a female portion 20 with a female portion engagement edge 21. To better appreciate the structure of the coupler component 15, reliance may also be had on FIGS. 3 and 4 which disclose the extruded product prior to being separated into the individual pipe sections 12.

Having reference to all the drawings, it will be appreciated that the pipe sections 12 are formed having a plurality of first corrugations 22. Each of the first corrugations 22 are formed having a crest or peak 25 as well as a trough or valley 28. The crests 25 and valleys 28 associated with each of the first corrugations 22 are connected by side walls 30.

Meanwhile, it will be appreciated that the male portion 18 is formed having at least one second corrugation 32. This second corrugation 32 is formed with a crest 35 and a valley 38 connected together by side wall 40. While the width of the second corrugation 32 is approximately the same as the width of the first corrugation 22, it will be readily appreciated that the distance between the crests and valley of the first corrugation being a first distance, is greater than the distance between the crest and valley of the second corrugation which is a second distance. In the preferred embodiment of the invention there is only a single second corrugation.

The male portion 18 also includes at least a single third corrugation 42. This third corrugation 42 has a crest 45 and a valley 48 connected by the third corrugation side wall 50. Once again, although the width of the third corrugation is approximately the same as both the first and second corrugations 22 and 32 respectively, the height of the third corrugation, with that height being the difference between crest 45 and valley 48, is less than the height of the first corrugation. The height of the third corrugation, the third distance, is preferably the same as the height of the second corrugation 32, the second distance.

One important difference between the crest 45 of the third corrugation 42 and the first or third corrugations is that the third corrugation includes a recessed or notched area 55. This recessed area 55 can be seen as accommodating or seating a sealing ring 60 which is secured between the recessed area 55 of the crest 45 of the third corrugation 42 of male portion 18 and the female portion 20. Specifically, the sealing ring 60 comes into contact with the female portion wall member 65. As such, the sealing ring performs as a gasket. An advantage of the structure of this invention over preexisting pipe structures is that using an elastomeric seal placed in a notched-type corrugation, as disclosed by this invention, provides a more economical seal than those which encase the entire juncture of adjacent pipes, due to not needing as large a mass of gasketing material.

The female portion wall member 65 has a side wall 68 as well as the engaging wall 70, which engaging wall actually comes into contact with the sealing ring 60. The engaging wall 70 is formed having at least one engaging wall corrugation 72, although in the preferred embodiment there is more than one such engaging wall corrugation. Each engaging wall corrugation 72 has a crest 75 as well as a valley 78, with the crest and valley being connected by an engaging wall corrugation side wall 80. The engaging wall corrugations 72, also referred to as stiffening rings, additionally provide dimensional control by making sure that the bell of the female portion wall member 65 remains concentric. As can best be seen with reference to FIG. 2, in the preferred embodiment of the invention the outer diameter of the female portion engagement edge 21 is equal to the outer diameter of the first or main corrugations 22.

Figure 4:
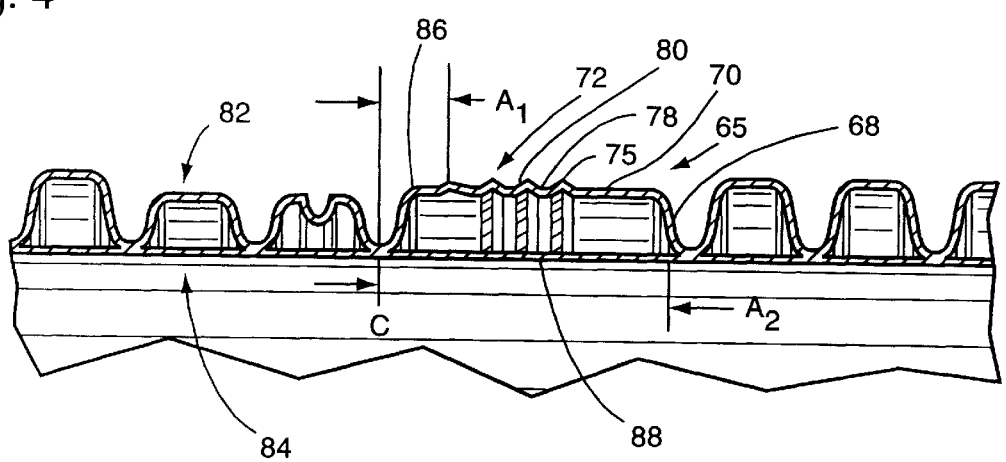
FIG. 4 is a vertical sectional view on an enlarged scale of the portion of the pipe shown in FIG. 3.

In actual use, the structure is formed by extruding both the outer wall 82 and inner wall 84 together. Air or pressure is used to bring the two walls into contact with one another as is well known in the art of dual wall pipe extrusion. The extruded product is then cut at line C completely through the extruded structure, then the portion of the outer wall section 86 corresponding to the length A-1 shown in FIG. 4 is cut away, as is the portion of inner wall section 88 shown in FIG. 4 having the distance A-2.

In actual field installation, one pipe section can be positioned in the trench dug for it. A sealing ring 60 is placed within the recessed area 55. A female portion of a pipe section 12 is then engaged with the male portion 18 of the other pipe section 12. As such, it can be readily appreciated that the installation of the pipe of this invention does not involve relining. When the pipe sections are aligned as shown in FIG. 2, the crests 75 associated with the engaging wall corrugation 72 should be approximately the same distance from the inner wall 84 as crest 25 of the first corrugations 22 us above the same inner wall 84.

Therefore, not only are the various joints aligned, but no special digging is required. This constitutes a considerable reduction in labor as well as installation expense.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. An indeterminate length of pipe comprised of at least two corrugated sections of pipe joined by a coupler component, said coupler component having a male portion and a female portion to connect two of the corrugated sections, each corrugated section having a plurality of first corrugations, each of said first corrugations having a crest and a valley with the distance between the crest and valley of said first corrugations being a first distance, said male portion of each coupler component having at least one second corrugation, each said second corrugation having a crest and valley with the distance between the crest and valley of said second corrugation being a second distance, said male portion of each coupler component having at least one third corrugation, each said third corrugation having a crest and valley with the distance between the crest and valley of said third corrugation being a third distance, said crest of said third corrugation having a recessed area, said recessed area accommodating a sealing element, with said sealing element being retained between said recessed area and said female portion, said second distance and said third distance each being less than said first distance.

2. The pipe according to claim 1 wherein said pipe is dual-wall.

3. The pipe according to claim 2 wherein there is only a single second corrugation.

4. The pipe according to claim 2 wherein there is only a single third corrugation.

5. The pipe according to claim 2 wherein said female portion has a wall member having a crest and valley, with the distance between the crest and valley of said female portion being a fourth distance, said fourth distance being greater than each of said second distance and said third distance.

6. The pipe according to claim 5 wherein said fourth distance is less than said first distance.

7. The pipe according to claim 5 wherein said female portion wall member telescopically receives said second corrugation and said third corrugation.

8. The pipe according to claim 1 wherein there is only a single second corrugation.

9. The pipe according to claim 1 wherein there is only a single third corrugation.

10. The pipe according to claim 1 wherein said female portion has a wall member having a crest and valley, with the distance between the crest and valley of said female portion being a fourth distance, said fourth distance being greater than each of said second distance and said third distance.

11. The pipe according to claim 5 wherein said fourth distance is less than said first distance.

12. The pipe according to claim 5 wherein said female portion wall member telescopically receives said second corrugation and said third corrugation.

13. A connection between two sections of corrugated pipe, said pipe having a plurality of first corrugations, each of said first corrugations having a crest and a valley with the distance between the crest and valley of said first corrugations being a first distance, said connection comprising a male portion integrally molded to one of said sections and a female portion integrally molded to the other of said sections, said male portion having at least one second corrugation, each said second corrugation having a crest and valley with the distance between the crest and valley of said second corrugation being a second distance, said male portion also having at least one third corrugation, each said third corrugation having a crest and valley with the distance between the crest and valley of said third corrugation being a third distance, said crest of said third corrugation having a recessed area, said female portion having a plurality of corrugations thereon, each of said female portion corrugations having a crest and a valley with the distance between the crest and valley of said female portion corrugations being less than each of said second distance and said third distance.

14. The connection according to claim 13 wherein there is only a single second corrugation.

15. The connection according to claim 13 wherein there is only a single third corrugation.

16. The connection according to claim 13 wherein said female portion has a wall member having a crest and valley, with the distance between the crest and valley of said female portion being a fourth distance, said fourth distance being greater than each of said second distance and said third distance.

17. An indeterminate length of dual-wall plastic pipe comprised of at least two corrugated sections of pipe joined by a coupler component, said coupler component having a male portion and a female portion to connect said at least two corrugated sections, each corrugated section having a plurality of first corrugations, each of said first corrugations having a crest and a valley with the distance between the crest and valley of said first corrugations being a first distance, said male portion of each coupler component having a single second corrugation, each said second corrugation having a crest and valley with the distance between the crest and valley of said second corrugation being a second distance, said male portion of each coupler component having a single third corrugation, said female portion having a wall member having a crest and valley, with the distance between the crest and valley of said female portion being a fourth distance, said fourth distance being greater than each of said second distance and said third distance, said fourth distance being less than said first distance, said female portion wall member telescopically receiving said second corrugation and said third corrugation, each said third corrugation having a crest and valley with the distance between the crest and valley of said third corrugation being a third distance, said crest of said third corrugation having a recessed area, said recessed area accommodating a sealing element, with said sealing element being retained between said recessed area and said female portion, said second distance and said third distance each being less than said first distance.

\* \* \* \* \*

UNITED STATES PATENT AND TRADEMARK OFFICE
CERTIFICATE OF CORRECTION

PATENT NO : 6,126,209
DATED : October 3, 2000
INVENTOR(S): James B. Goddard

It is certified that error appears in the above-identified patent and that said Letters Patent are hereby corrected as shown below:

Column 3, line 10, cancel "greater" and substitute therefor --less--.
    line 11, cancel "although" and substitute therefor --and--;
    line 41, cancel "greater" (both occurrences and substitute therefor --less-- (both occurrences);
    line 67, cancel "greater" and substitute therefor --less--;

Column 4, line 1, cancel "but" and substitute therefor --and--;

Column 6, line 32, cancel "greater" and substitute therefor --less-;
    line 46, cancel "greater" and substitute therefor --less--;

Column 7, line 15, cancel "greater" and substitute therefor --less--;

Column 8, line 6, after "corrugation," insert -- each said third corrugation having a crest and valley with the distance between the crest and valley of said third corrugation being a third distance,--;
    line 9, cancel "greater" and substitute therefor --less--;

UNITED STATES PATENT AND TRADEMARK OFFICE
CERTIFICATE OF CORRECTION

PATENT NO. : 6,126,209
DATED : October 3, 2000
INVENTOR(S) : James B. Goddard

It is certified that error appears in the above-identified patent and that said Letters Patent is hereby corrected as shown below:

line 13, after "corrugation," delete --each said third corrugation having a crest and valley with the distance between the crest and valley of said third corrugation being a third distance,--.

Signed and Sealed this

Twenty-fourth Day of April, 2001

*Attest:*

NICHOLAS P. GODICI

*Attesting Officer*    *Acting Director of the United States Patent and Trademark Office*